US009788221B2

(12) United States Patent
Onishi

(10) Patent No.: US 9,788,221 B2
(45) Date of Patent: Oct. 10, 2017

(54) SERVER DEVICE CAPABLE OF ANALYZING COMMUNICATION BEHAVIOR, CONTROL DEVICE, CONTROL METHOD FOR MOBILE TERMINAL, AND COMPUTER READABLE MEDIUM

(71) Applicant: NEC Corporation, Tokyo (JP)

(72) Inventor: Tatsuo Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 53 days.

(21) Appl. No.: 14/430,720

(22) PCT Filed: Sep. 12, 2013

(86) PCT No.: PCT/JP2013/005400
§ 371 (c)(1),
(2) Date: Mar. 24, 2015

(87) PCT Pub. No.: WO2014/049997
PCT Pub. Date: Apr. 3, 2014

(65) Prior Publication Data
US 2015/0281986 A1 Oct. 1, 2015

(30) Foreign Application Priority Data

Sep. 25, 2012 (JP) .................................. 2012-210261

(51) Int. Cl.
*H04W 24/08* (2009.01)
*H04W 16/32* (2009.01)
(Continued)

(52) U.S. Cl.
CPC ........... *H04W 24/08* (2013.01); *H04W 16/32* (2013.01); *H04W 36/0011* (2013.01);
(Continued)

(58) Field of Classification Search
None
See application file for complete search history.

(56) References Cited

U.S. PATENT DOCUMENTS 6,266,330 B1 * 7/2001 Jokinen ................ H04B 7/2643
370/280
6,567,665 B1 * 5/2003 Kissee .................. H04W 36/22
455/436
(Continued)

FOREIGN PATENT DOCUMENTS

JP   2007-512783   5/2007
JP   2011-216936   10/2011
(Continued)

OTHER PUBLICATIONS

Supplementary European Search Report mailed May 10, 2016, by the European Patent Office in counterpart European Patent Application No. 13842289.4.
(Continued)

*Primary Examiner* — Tejis Daya
(74) *Attorney, Agent, or Firm* — Finnegan, Henderson, Farabow, Garrett & Dunner, L.L.P.

(57) ABSTRACT

A server device of the invention prevents congestion in a wireless network due to an excessive number of accesses. The behavior analysis server device includes a behavior analysis unit which analyzes data packets of each mobile terminal connected to the wireless network within a predetermined analysis time and generates information indicating communication behavior as communication behavior information; a recording unit which records the communication behavior information; and a type determination unit which determines whether the communication behavior information satisfies a predetermined behavior type determination condition, and transmits a notification for connecting, a mobile terminal that has performed a communication asso- (Continued)

ciated with the communication behavior information satisfying the predetermined behavior type determination condition, to a predetermined cell.

12 Claims, 5 Drawing Sheets

(51) Int. Cl.
  *H04W 36/04* (2009.01)
  *H04W 36/22* (2009.01)
  *H04W 36/00* (2009.01)
  *H04W 24/02* (2009.01)

(52) U.S. Cl.
  CPC ........... *H04W 36/04* (2013.01); *H04W 36/22* (2013.01); *H04W 24/02* (2013.01)

(56) References Cited

U.S. PATENT DOCUMENTS

| | | | |
|---|---|---|---|
| 8,600,384 B1* | 12/2013 | Moreno | H04W 36/22 370/331 |
| 9,001,769 B1* | 4/2015 | Park | H04W 36/06 370/329 |
| 9,226,210 B1* | 12/2015 | Saleh | H04W 36/0022 |
| 2004/0166863 A1* | 8/2004 | Kim | H04W 4/06 455/449 |
| 2005/0111462 A1 | 5/2005 | Walton et al. | |
| 2008/0045262 A1 | 2/2008 | Phan et al. | |
| 2010/0054231 A1* | 3/2010 | Dolganow | H04W 76/068 370/349 |
| 2010/0120437 A1* | 5/2010 | Foster | H04W 36/04 455/444 |
| 2010/0173632 A1* | 7/2010 | Kitaji | H04W 36/0083 455/436 |
| 2011/0053596 A1 | 3/2011 | Wohlert et al. | |
| 2011/0205081 A1* | 8/2011 | Chen | H04Q 9/00 340/870.01 |
| 2011/0244866 A1* | 10/2011 | Yamamoto | H04W 36/22 455/438 |
| 2012/0023235 A1* | 1/2012 | Hole | H04W 72/1268 709/226 |
| 2012/0124196 A1* | 5/2012 | Brisebois | H04W 76/046 709/224 |
| 2012/0142352 A1 | 6/2012 | Zhang et al. | |
| 2012/0172082 A1* | 7/2012 | Abbadessa | H04W 60/04 455/524 |
| 2012/0214529 A1 | 8/2012 | Ohta et al. | |
| 2012/0221955 A1* | 8/2012 | Raleigh | H04M 15/00 715/736 |
| 2013/0044603 A1* | 2/2013 | MacIas | H04W 48/18 370/241 |
| 2013/0252660 A1* | 9/2013 | Bach | H04W 52/0206 455/525 |
| 2014/0181257 A1* | 6/2014 | Sridhar | H04L 67/32 709/219 |

FOREIGN PATENT DOCUMENTS

| | | |
|---|---|---|
| RU | 2 378 800 C2 | 1/2010 |
| WO | WO 2008/134219 A1 | 11/2008 |
| WO | WO 2010/107529 A1 | 9/2010 |
| WO | WO 2011/149533 A1 | 12/2011 |
| WO | WO 2012/064067 A2 | 5/2012 |

OTHER PUBLICATIONS

V.V. Velichko, "Data Transmission in Third Generation Mobile Networks", Radio and Communications, Hotline—Telecom, 2005.
Russian Office Action mailed Apr. 4, 2016, by the Russian Patent Office in counterpart Russian Patent Application No. 2015115635.
Japanese Office Action mailed Apr. 5, 2016, by the Japanese Patent Office in counterpart Japanese Patent Application No. 2014-538142.
International Search Report and Written Opinion mailed Nov. 5, 2013 in corresponding PCT International Application.
Notice of Allowance mailed Nov. 29, 2016, by the Japanese Patent Office in counterpart Japanese Patent Application No. 2014-538142.
Extended European Search Report mailed Sep. 20, 2016, by the European Patent Office in counterpart European Patent Application No. 13842289.4.

\* cited by examiner

SERVER DEVICE CAPABLE OF ANALYZING COMMUNICATION BEHAVIOR, CONTROL DEVICE, CONTROL METHOD FOR MOBILE TERMINAL, AND COMPUTER READABLE MEDIUM

CROSS-REFERENCE TO RELATED PATENT APPLICATIONS

This application is a National Stage Entry of International Application No. PCT/JP2013/005400, filed Sep. 12, 2013, which claims priority from Japanese Patent Application No. 2012-210261, filed Sep. 25, 2012. The entire contents of the above-referenced applications are expressly incorporated herein by reference.

TECHNICAL FIELD

The present invention relates to a server device that controls a mobile terminal connected to a communication network (hereinafter, referred to as a "wireless network" or a "network" in the present application) having a hierarchical cell structure in which a small scale microcell is disposed in a macrocell, for example. The present invention particularly relates to a control to select a base station to which a mobile terminal is connected.

BACKGROUND ART

Mobile terminals, such as smartphones and tablet terminals, are increasingly being used, whereby applications used in the mobile terminals have diversified. The increased use of the mobile terminals and the diversification have led to a huge communication traffic load and a sharp increase in the number of accesses.

Some of the applications, such as video streaming, involve particularly high traffic. Furthermore, some of the applications, such as chatting and Voice over IP, involve relatively low traffic and a large number of accesses. The increase in the use of the former applications has raised a problem of increased traffic. Furthermore, recently, the use of the latter applications has increased, and thus now there is also a problem of a huge number of accesses. All things considered, a serious problem, which is congestion in a wireless network, is caused by the increased traffic and the huge number of accesses.

As one solution to the problem described above, a hierarchical cell structure (also known as a hierarchical network, and hereinafter referred to as "HCS" in the present application) have been under study. The HCS is a wireless network structure as a combination of a macrocell base station (hereinafter, simply referred to as "macrocell") that covers a wide area and a microcell base station (hereinafter, simply referred to as "microcell") that covers a smaller area. In the present application, the microcell is a term used for all the cells relatively small with respect to the macrocell. Thus, the microcell includes a femtocell, a picocell, and the like.

A standardizing body 3GPP (3rd Generation Partnership Project) has standardized the HCS of a wireless network based on LTE (Long Term Evolution) or LTE-Advanced (hereinafter, referred to as "LTE-A") as the successor of the LTE. The HCS is known as HetNet (Heterogeneous Network).

The HCS, which was originally a technique for increasing area coverage in a wireless network, has recently been used for preventing the congestion in a wireless network. For example, in the HetNet, the microcell is disposed at a local place (hot spot), such as a coffee shop or a school involving high traffic, in an area of a macrocell network. Thus, the local high traffic can be covered by the microcell covering a smaller area, whereby congestion due to high traffic in particular can be prevented.

SUMMARY OF INVENTION

Technical Problem

However, a general method for selecting a base station in a wireless network has the following problem. Specifically, a mobile terminal is more preferentially connected to a base station with a higher RSRP (Reference Signal Received Power). Thus, when users using a certain application are gathered, an extremely large number of mobile terminals, involving low traffic and a larger number of accesses, might be connected to the microcell. For example, when chat users are gathered in a hotspot such as a coffee shop, a large number of mobile terminals of the users are concentrated on the microcell covering the hotspot. As a result, the capacity (concurrent accesses) of concurrently processing a plurality of accesses at the micorcell might reach the limit. Thus, no new mobile terminal can be attached (connected, accessed) to the microcell, even when the microcell still has an enough capacity to process the traffic.

Thus, the excessive number of accesses described above disables the microcell to process the desired amount of traffic. As a result, the HCS cannot exert the effect of preventing the congestion due to high traffic as designed.

The present invention may resolve the problems described above. An exemplary objective of the present invention is to provide a behavior analysis server device that can prevent congestion in a wireless network due to an excessive number of accesses, caused when a large number of mobile terminals, executing an application involving low traffic and a large number of accesses, are gathered in an area covered by a predetermined microcell, and the like.

Solution to Problem A behavior analysis server device as one aspect of the present invention to achieve the objective, includes, a analysis unit which analyzes data packets of each mobile terminal connected to the wireless network within a predetermined analysis time and generates information indicating communication behavior as communication behavior information;

a recording unit which records the communication behavior information; and a type determination unit which determines whether the communication behavior information satisfies a predetermined behavior type determination condition, and transmits a notification for connecting, a mobile terminal that has performed a communication associated with the communication behavior information satisfying the predetermined behavior type determination condition, to a predetermined cell. As another way of achieving the objective, a control method for a mobile terminal as another aspect of the present invention includes, analyzing data packets of each mobile terminal connected to the wireless network within a predetermined analysis time;

generating information indicating communication behavior as communication behavior information;

recording the communication behavior information in a recording unit;

determining whether the communication behavior information satisfies a predetermined behavior type determination condition; and a determination result process of connecting, a mobile terminal that has performed a communication associated with the communication behavior information determined to satisfy the predetermined behavior type determination condition in the determining step, to a predetermined cell.

Further, the objective is also achieved by a computer program that causes a computer to implement a behavior analysis server device including the configurations described above and a method associated with the device, and by a computer readable storage medium storing the computer program.

Advantageous Effects of Invention

The present invention can implement a behavior analysis server device that can prevent congestion in a wireless network due to an excessive number of accesses, caused when a large number of mobile terminals, executing an application involving low traffic and a large number of accesses, are gathered in an area covered by a certain microcell, and the like.

DESCRIPTION OF EMBODIMENTS

Now, an exemplary embodiment of the present invention is described in detail with reference to the drawings.

A configuration using HetNet which is a hierarchical network based on an LTE or LTE-A system is exemplarily described below.

Figure 1:
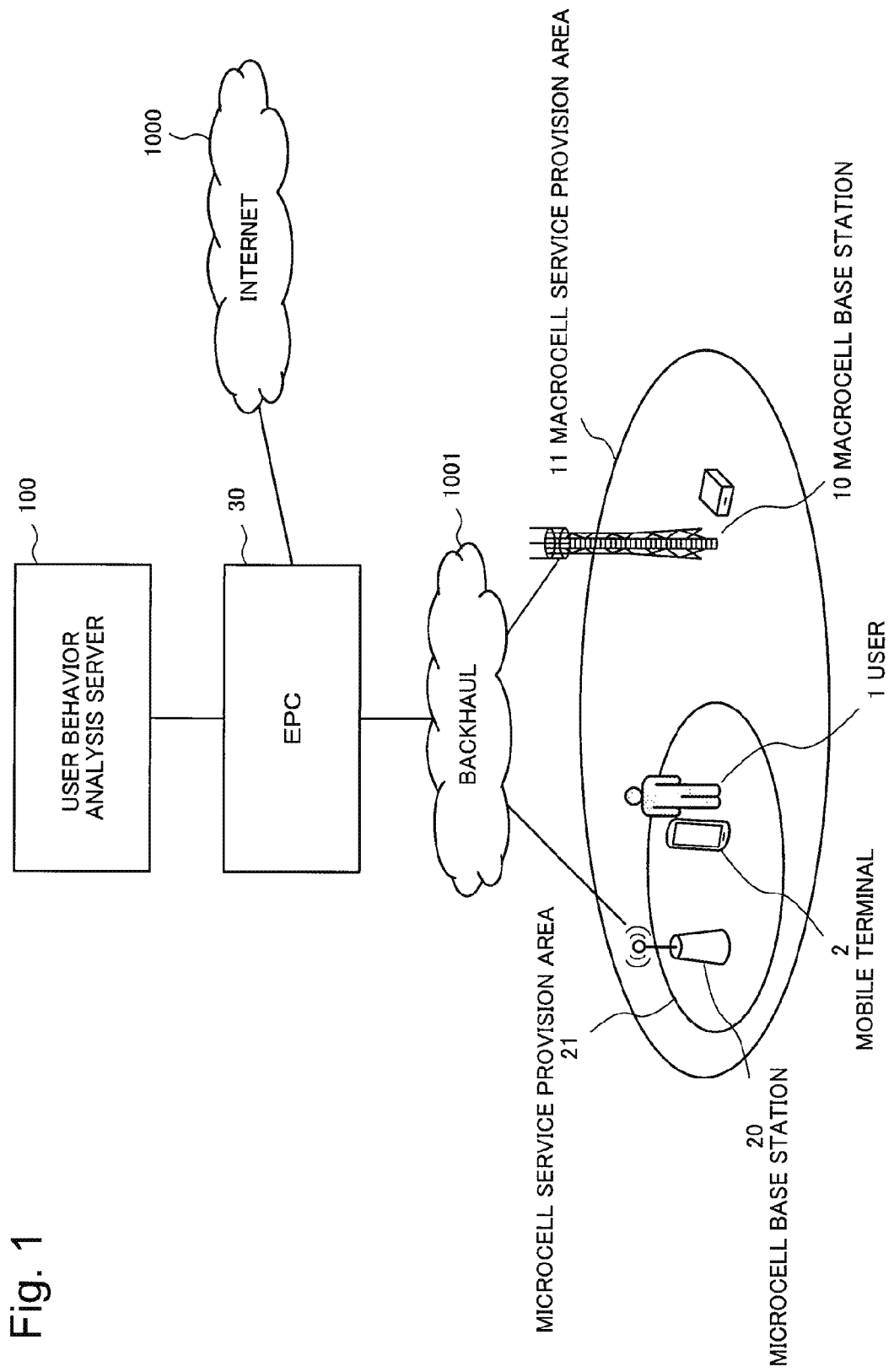
FIG. 1 is a schematic diagram illustrating a system configuration in an exemplary embodiment of the present invention.

FIG. 1 is a schematic diagram illustrating a system configuration in the exemplary embodiment of the present invention.

As shown in FIG. 1, a HetNet system of the present exemplary embodiment includes a user 1, a mobile terminal 2, a macrocell base station 10, a macrocell service provision area 11, a microcell base station 20, a microcell service provision area 21, an EPC (Evolved Packet Core) 30, a user behavior analysis server 100, the Internet 1000, and a backhaul 1001. The Internet 1000 is an example of a communication means.

The user 1 moves while carrying around the mobile terminal 2, and executes various applications on the mobile terminal 2. The applications executed by the user 1 communicate with an application server (not illustrated) through the Internet 1000.

The mobile terminal 2 is a terminal carried around by the user 1. The mobile terminal 2 is a terminal device that is implemented by a smartphone, a tablet terminal, a mobile phone, and the like. Various applications such as Voice over IP, chatting, or video streaming can be executed on the mobile terminal 2.

The macrocell base station 10 is a relatively large base station that covers a large area. For example, the macrocell base station 10 is assumed to be capable of providing network services within an area having a radius of several kilometers. Concurrent accesses, representing the number of mobile terminal 2 that can be simultaneously attached to the macrocell base station 10, are assumed to be about several thousand, for example.

The macrocell service provision area 11 is a coverage area in which the mobile terminal 2 can utilize network services from the macrocell base station 10.

The microcell base station 20 is a base station smaller than the macrocell base station 10. For example, the microcell base station 20 is assumed to be capable of providing network services within an area having a radius of several hundred meters. Concurrent accesses of the microcell base station 20 are assumed to be about several hundred, for example.

The microcell service provision area 21 is a coverage area in which the mobile terminal 2 can utilize the network services from the microcell base station 20.

The HetNet system of the present exemplary embodiment has a configuration in which the relatively small microcell base station 20 is disposed in the service provision area 11 of the large macrocell base station 10. Thus, in the microcell service provision area 21, the network services from both the macrocell base station 10 and the microcell base station 20 can be utilized.

Still, in the microcell service provision area 21, the microcell base station 20 is the closest base station with the highest field intensity. Thus, normally, the EPC 30 described later selects the microcell base station 20 as the base station to which the mobile terminal 2 in the microcell service provision area 21 is attached, in base station selection. More specifically, normally, the mobile terminal 2 that has moved into the microcell service provision area 21 from the macrocell service provision area 11 has the connection destination changed to the microcell base station 20 by the EPC 30 (handover).

The EPC 30 is a common base station control device (core network device) that controls base stations forming a hierarchical network. The EPC 30 is connected to the macrocell base station 10 and the microcell base station 20 through the backhaul 1001, and controls the base stations.

The backhaul 1001 is high-capacity network connecting between the core network device and the base stations of the mobile phone. More specifically, the backhaul 1001 is a network connecting the EPC 30 to the macrocell base station 10 and the microcell base station 20.

The EPC 30 in LTE and LTE-A is capable of containing not only LTE networks but is also capable of containing 2G and 3G networks that have been provided.

Various wireless access systems (switched network and access network) can be concentrated in the EPC 30. Thus, while the macrocell base station 10 and the microcell base station 20 are featured in the present exemplary embodiment, the present exemplary embodiment can be similarly applied between various wireless networks concentrated in a core network device.

Figure 2:
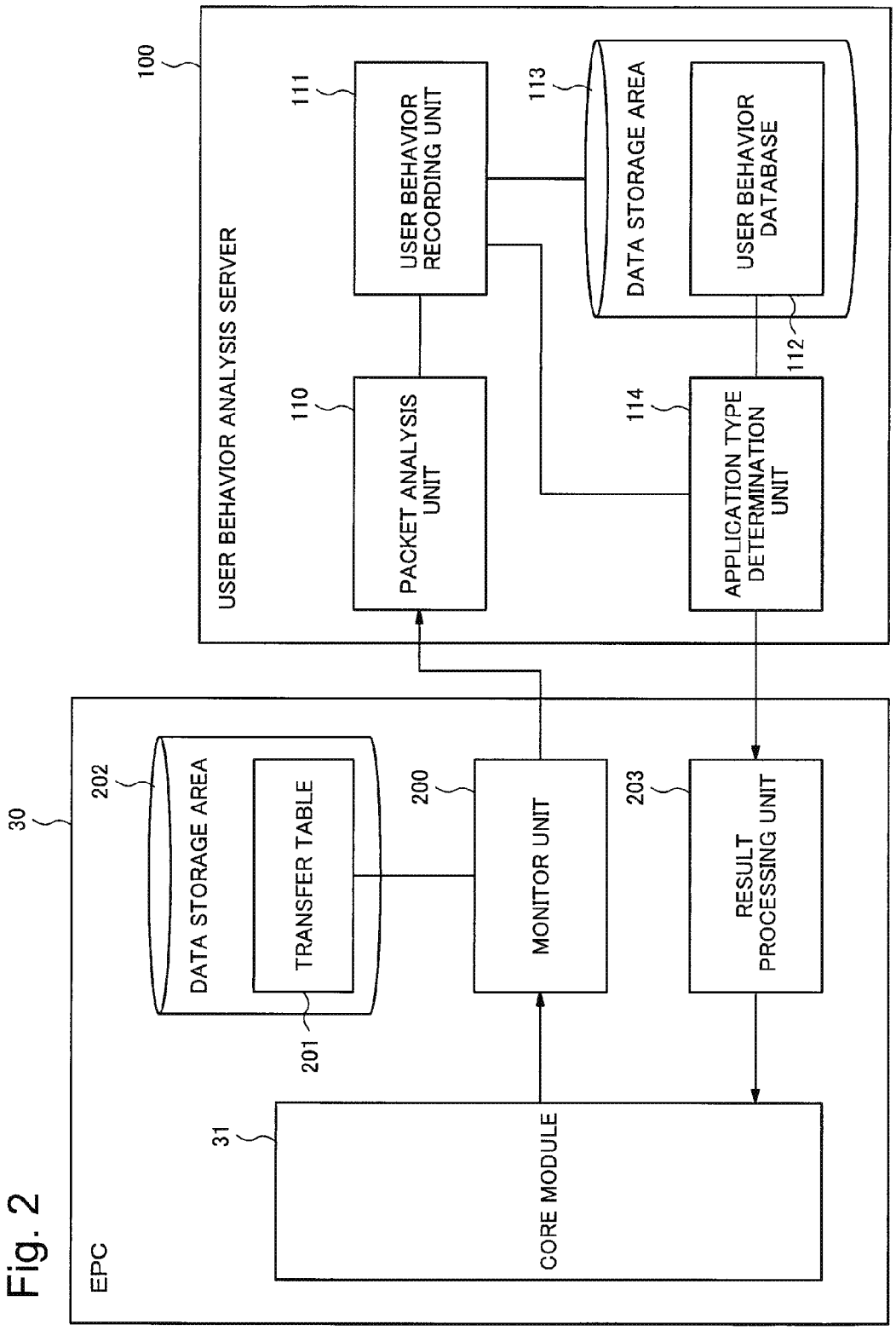
FIG. 2 is a block diagram illustrating a configuration of the exemplary embodiment of the present invention.

Configurations of exemplary embodiments are described in detail below with reference to FIG. 2. FIG. 2 is a block diagram showing a configuration of an exemplary embodiment of the present invention. As shown in FIG. 2, the EPC 30 includes a core module 31, a monitor unit 200, a transfer table 201, a data storage area 202, and a result processing unit 203.

The core module 31 performs a control related to movement such as handover and position registration for the mobile terminal 2, a control related to connection (bearer) and authentication for communications between the mobile terminal 2 and the Internet 1000, and transmission of user data packets transmitted and received between an application on the mobile terminal 2 and the Internet 1000.

The monitor unit 200 monitors the user data packets (hereinafter, simply referred to as "data packets" or "packets") and additional information transmitted by the EPC 30 (monitoring), to detect a communication satisfying a condition to start user behavior analysis. The monitor unit 200 registers information indicating a communication as an analysis target in the transfer table 201. The monitor unit 200 transfers replicas of packets in a communication which is an analysis target, and additional information, to the user behavior analysis server 100, during a predetermined analysis time.

The additional information is information related to the communication as the analysis target. For example, the additional information may include communication status information indicating an event such as new connection establishment or movement of the mobile terminal between cells, information for identifying a user, and the like. The additional information may include more detail information. For example, the additional information may include information, obtained from an IP header of the corresponding packet, such as a source IP address, a destination IP address, and a protocol type. For example, the additional information may include information, obtained from a protocol header of TCP, UDP, or the like, such as a source port number, a destination port number, a sequence number, and the like. The additional information may include information, obtained from a header of an application layer such as an URI (Uniform Resource Identifier), an Content-Type, and the like. The information pieces described above may be obtained through direct analysis on the packet. Alternatively, the EPC 30 in LTE and LTE-A can obtain the information pieces through a packet analysis function called DPI (Deep Packet Inspection). The information obtained through the DPI may include information obtained from packets that have been transmitted before the packet as the analysis target.

The transfer table 201 is a database that stores registered information indicating a communication as the target of the user behavior analysis. The transfer table 201 is stored in the data storage area 202.

The registered information stored in the transfer table 201 includes identification information (packet identification information) indicating the analysis target packet in the data packets transmitted from the EPC 30 and information (analysis time determination information) for determining a predetermined analysis time. For example, the packet identification information includes ID information for identifying a user performing the communication, information related to a connected base station, address information (IP address and port number) of the source or the destination of the packet, and the like. For example, the analysis time determination information includes start time or scheduled end time of the analysis and the like.

For example, the data storage area 202 is implemented by a semiconductor memory device or a disk device.

The result processing unit 203 receives result notification including a determined application type and the identification information of the communication which is the determination target from the user behavior analysis server 100. The result processing unit 203 deletes the registered information, corresponding to the result notification, from the transfer table 201. The result processing unit 203 transmits a handover notification indicating that the mobile terminal 2 is to be handed over, in accordance with the content of the result notification.

Next, a configuration of the user behavior analysis server 100 will be described with reference to FIG. 2.

The user behavior analysis server 100 includes a packet analysis unit 110, a user behavior recording unit 111, a user behavior database 112, a data storage area 113, and an application type determination unit 114.

The packet analysis unit 110 analyzes the replicas of the packets and the additional information received from the monitor unit 200, to generate user behavior data. The packet analysis unit 110 transmits the user behavior data thus generated to the user behavior recording unit 111. The user behavior data is information obtained from the received packets as the analysis target and the additional information. For example, the user behavior data may include address information indicating connection source and destination of the communication, identification information indicating the communication such as a user identifier, information related to a packet data quantity and to time of the communication such as the packet reception time, a content of the user data, a content of the additional information, and the like.

The user behavior recording unit 111 stores the user behavior data generated by the packet analysis unit 110 in the user behavior database 112. The user behavior recording unit 111 calculates information indicating a communication pattern from the user behavior data related to a series of packets belonging to communications that have been analyzed. The information indicating the communication pattern may include the sum of data lengths of all the packets that have been set as the analysis target after the analysis has started, an average value and a maximum value of the packet communication intervals, the number of communications, an average traffic, information as the values differentiated between transmission and reception, and the like. Thus, the information indicating the communication pattern may include the information that can be obtained by analyzing the user behavior data related to a plurality of packets, in addition to the information obtained from a single packet.

The user behavior database 112 includes the user behavior data and the information indicating the communication pattern. The user behavior database 112 is stored in the data storage area 113.

For example, the data storage area 113 is implemented by a semiconductor memory device or a disk device.

The application type determination unit 114 determines the type of the application that is performing the communication to which the received packet as the analysis target belongs, based on the information in the user behavior database 112. The application type determination unit 114 transmits the result notification, including the type of the application thus determined, to the result processing unit 203.

In the present exemplary embodiment, information indicating the type of application type and information indicating determination conditions are assumed to be defined in advance as a type determination condition table. The type determination condition table is stored in the application type determination unit 114. The information indicating determination conditions is information of designating a predetermined threshold or a value range for at least one information piece in the information indicating the user behavior data and the information indicating the communication pattern. A condition for identifying the application type depends on a characteristic of the behavior in the communication performed by the application. For example, some applications may be identified with a header of a single packet, that is, by a transmission source port number or a URI of the destination. For example, other applications may be identified with a transmission state of a plurality of packets such as an order of packets in a communication, average traffic, a communication interval, or the number of communications. The application type determination unit 114 enough to know a characteristic required for determining a wireless access system as a connection destination. Thus, the application type determination unit 114 does not necessarily identify a specific application name.

The user behavior analysis server 100 can communicate with the EPC 30 through a communication network such as a LAN (local area network).

The EPC 30 and the user behavior analysis server 100 may be formed of a general information processing device (computer) that operates under a computer program control or may be formed of dedicated hardware.

Next, processing in the present exemplary embodiment including the configuration described above will be described in detail.

Figure 3:
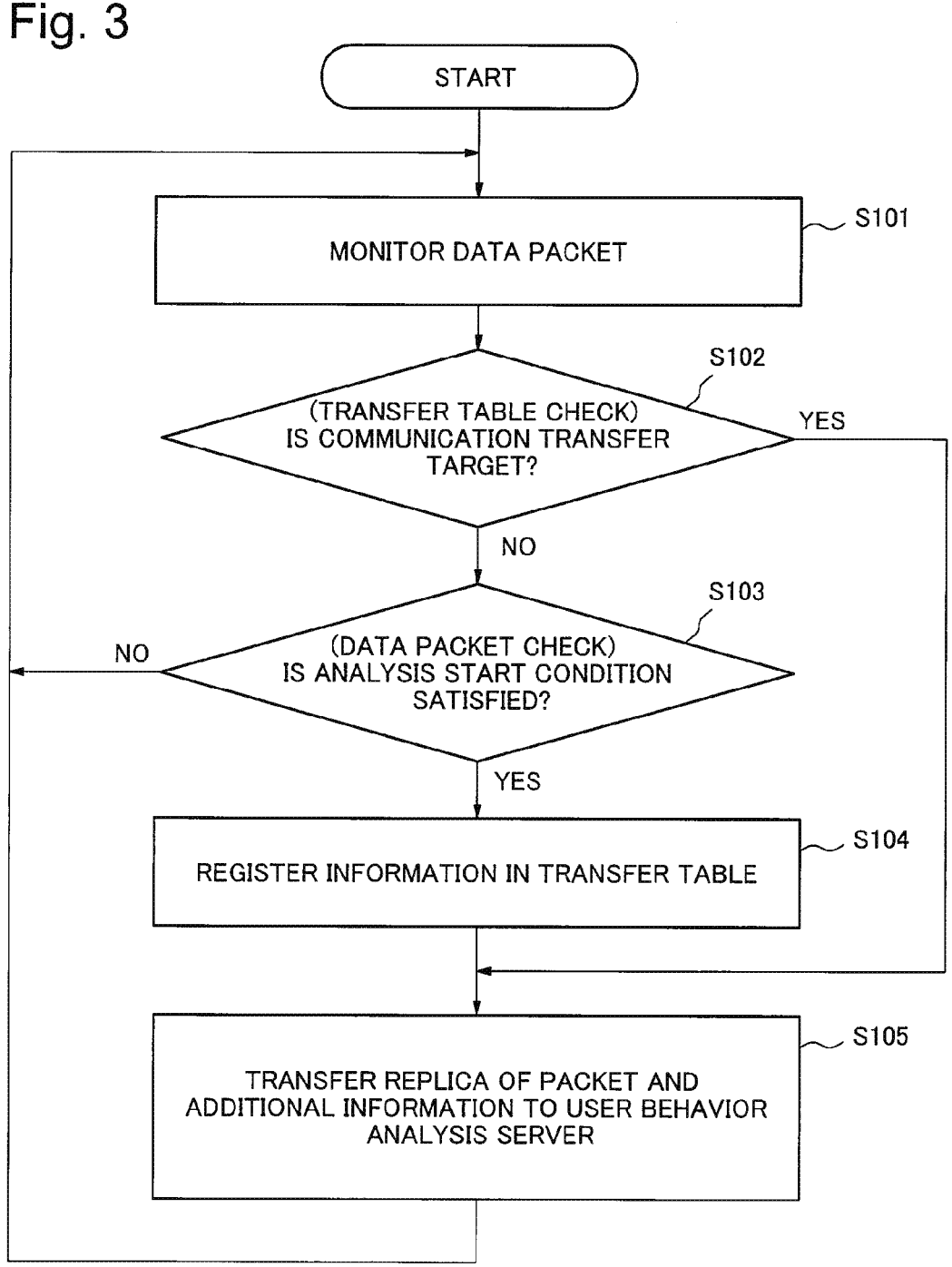
FIG. 3 is a flowchart illustrating processing performed by a monitor unit 200 in the exemplary embodiment of the present invention.

First, monitoring processing performed by the monitor unit 200 is described with reference to FIG. 3. FIG. 3 is a flowchart illustrating processing performed by the monitor unit 200 in the exemplary embodiment of the present invention.

First, after the EPC 30 is started, the monitor unit 200 starts monitoring data packets, related to a communication performed by the mobile terminal 2 carried around by the user 1, transmitted and received through the EPC 30 (step S101).

When a communication is performed between the application, operating on the mobile terminal 2, and an application server (not illustrated), connected through the Internet 1000, the monitor unit 200 receives a data packet and additional information of the communication through the core module 31. The monitor unit 200 checks whether the communication is a transferring target, based on the transfer table 201 (step S102).

The monitor unit 200 performs the checking as follows. First, the monitor unit 200 compares identification information of the packet in the registered information in the transfer table 201 and the identification information obtained from the received data packet and additional information. The monitor unit 200 determines that the communication has been registered when the information pieces match. Upon determining that the communication has been registered, the monitor unit 200 determines whether the analysis has been ended, based on determination information in the associated registered information and the current time point. The monitor unit 200 recognizes the communication as a transfer processing target, upon determining that the analysis has not been ended.

When the communication is the transfer processing target, the monitor unit 200 transfers the replica of the packet as the analysis target and the additional information to the user behavior analysis server 100 (step S105). Processing performed by the user behavior analysis server 100 after the replica of the data packet and the additional information are transferred will be described later.

When the communication has been registered in the transfer table 201 but the predetermined analysis time has already elapsed in step S102, the monitor unit 200 deletes the registered information indicating the communication from the transfer table 201, and then terminates the user behavior analysis. More specifically, this means that the monitor unit 200 has performed the monitoring of the communication and the user behavior analysis server 100 has performed behavior analysis, for a predetermined analysis time, but the analysis has ended with the application, related to the communication to which the packet as the analysis target belongs, satisfying none of the application type determination conditions. Thus, the monitor unit 200 terminates user behavior analysis for the communication without any further processing. Thus, the mobile terminal 2 performing the communication remains to be connected to the microcell base station 20.

When the communication has not been registered in the transfer table 201 in step S102, the monitor unit 200 checks whether to newly start the analysis (step S103). Conditions to start the analysis (start condition) include a case where a new communication has started, a case where the mobile terminal 2 has moved into the microcell service provision area 21 from the service provision area of another cell, and the like. The monitor unit 200 performs the checking while referring to communication status information in the additional information and packet data structure analysis.

When none of the start conditions are satisfied in step S103, the monitor unit 200 determines that the analysis is not required to be started. Thus, the monitor unit 200 terminates processing for the packet and the additional information at this point. Through the determination processing, the monitor unit 200 prevents a communication that has been once subjected to the user behavior analysis as a result of which the microcell base station 20 is continued to be connected to the microcell base station 20, from being the analysis target again.

When it is detected in step S103 that any of the start condition is satisfied, the monitor unit 200 determines to start the analysis on the communication. The monitor unit 200 registers information indicating the communication in the transfer table 201 with the current time point as the analysis start time point (step S104). More specifically, the monitor unit 200 registers the packet identification information indicating the analysis target and the determination information for the analysis time.

The monitor unit 200 transfers the replica of the packet and the additional information to the user behavior analysis server 100 (step S105).

Figure 4:
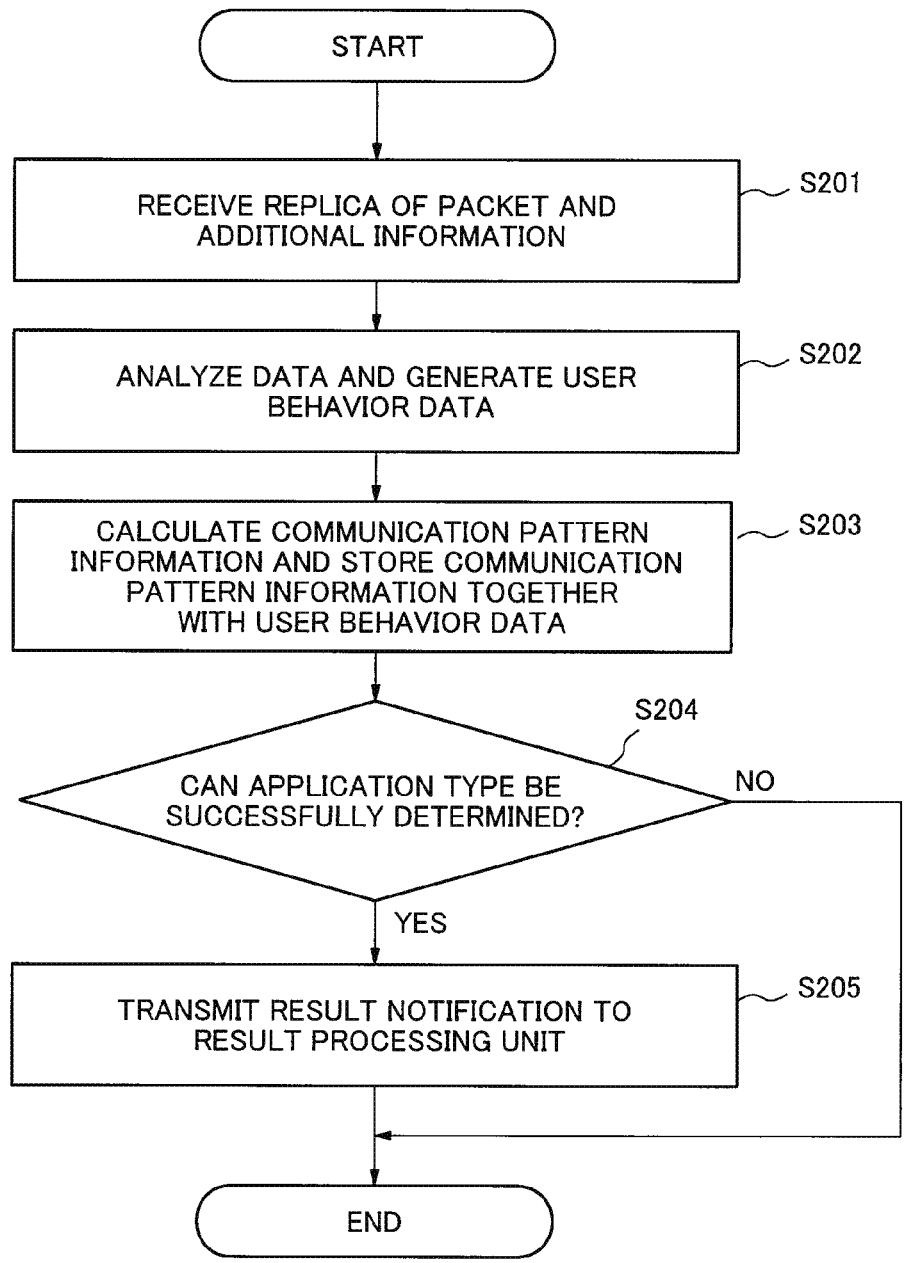
FIG. 4 is a flowchart illustrating processing performed by a user behavior analysis server 100 in the exemplary embodiment of the present invention.

Next, the behavior analysis processing performed by the user behavior analysis server 100 after the replica of the data packet and the additional information have been transferred will be described with reference to FIG. 4. FIG. 4 is a flowchart illustrating processing performed by the user behavior analysis server 100 in the exemplary embodiment of the present invention.

First, the packet analysis unit 110 receives the replica of the data packet (hereinafter, simply referred to as "the packet") and the additional information transferred from the monitor unit 200 (step S201).

Then, the packet analysis unit 110 analyzes the packet and the additional information thus received to generate the user behavior data (step S202). The user behavior data may include all the information that can be obtained from the packet and the additional information. The user behavior data may be partial information indicating a data type required for application type determination processing described later.

Next, the user behavior recording unit 111 reads out past user behavior data related to the same communication as the user behavior data generated by the packet analysis unit 110, from the user behavior database 112. The user behavior recording unit 111 calculates information indicating a communication pattern based on the generated user behavior data and the past user behavior data. The user behavior recording unit 111 stores the information indicating the communication pattern thus calculated and the generated user behavior data in the user behavior database 112 (step S203). For example, the sum of the data lengths of all the packets related to the communication, the average value of the packet communication intervals, and the number of communications are assumed to be calculated as the information indicating the communication pattern.

Then, the application type determination unit 114 uses the user behavior data related to the same communication as the received packet and the information indicating the communication pattern, extracted from the user behavior database 112, to determine whether the information satisfies a condition in the type determination condition table. A case where any of the conditions is satisfied is hereinafter also referred to as "type determination succeeded (successfully determined)" (step S204).

When the type is successfully determined, the application type determination unit 114 transmits to the EPC 30, the information indicating the application type thus determined and the identification information indicating the communication as the determination target (step S205). The processing performed by the EPC 30 after the result notification has been transmitted is described later.

When none of the conditions are satisfied and thus the type determination has failed in step S204, the application type determination unit 114 terminates the application type determination without any further processing. In this case, the series of processing in the monitoring and the analyzing are repeated on the subsequent packets in the communication. More specifically, the monitor unit 200 checks the transfer table 201 (step S102 in FIG. 1) after receiving the subsequent packet in the communication as the analysis target (step S101 in FIG. 1). Here, because the transfer table 201 includes the registered information indicating the communication, the monitor unit 200 transmits the replica of the newly received packet and the additional information to the user behavior analysis server 100 (step S105 in FIG. 1) as long as the predetermined analysis time has not elapsed. The processing performed by the user behavior analysis server 100 thereafter is as described above.

Three specific examples of the type determination condition in step S204 are described below. First, a case where the ranges of the destination IP address and the destination port are designated as the first specific example of the type determination condition is described. In this case, the application type determination unit 114 can immediately determine that the determination condition is satisfied upon receiving the first packet of the communication by referring to the header information thereof. Thus, the type is successfully determined in the first specific example.

A case where the destination URI to which the connection is requested by the application operating on the mobile terminal 2 after the authentication by the application server has completed is designated as the condition, that is the second example of the type determination condition, is described. In this case, the type determination condition is not satisfied at the point when the first packet is received because the authentication has not been completed yet. Thus, the monitoring processing and the analyzing processing are continued to be performed on the subsequently transmitted-received packet until the authentication is completed. The determination unit 114 finally determines that the second condition is satisfied when the packet requesting the connection to the destination URI becomes the analysis target. Thus, the determination unit 114 succeeds in the type determination in the second specific example.

A case is described where a threshold range is set for each of the sum (D) of the data lengths of all the packets, an average value (T) of the packet communication intervals, and the number of communications (C), as the third example of the type determination condition. Here, the condition is determined to be satisfied when all the values are in the threshold ranges, that is, when, for example, D<1 (megabyte), T>100 (milliseconds), and C>10 (times) are all satisfied. The condition enables the detection of the applications with the behavior of transmitting a small amount of data through each of a large number of communications at an interval within a predetermined analysis time (that is, involving low traffic and a large number of accesses).

For example, when the user using an application enters the micro service provision area 21 from the outside, the determination condition directed to the particular operation performed immediately after the application is started might not be satisfied as in the case of the second type determination condition described above. This is because when the user 1 moves after the point of "connecting to the destination URI" in the description of the second type determination condition, the type cannot be determined with the second determination condition. More specifically, when a certain time elapses after the application has been started to be used, the monitor unit 200 might not be able to obtain the feature of the application that can be found only in the early stage of the communication after the application has started. Thus, only a small amount of additional information might be usable for the determination by the determination unit 114. Even in such a case, with the third type determination condition, the determination unit 114 can successfully determine the type when the information indicating the communication pattern calculated in the processing in step S203 satisfies the determination condition.

Figure 5:
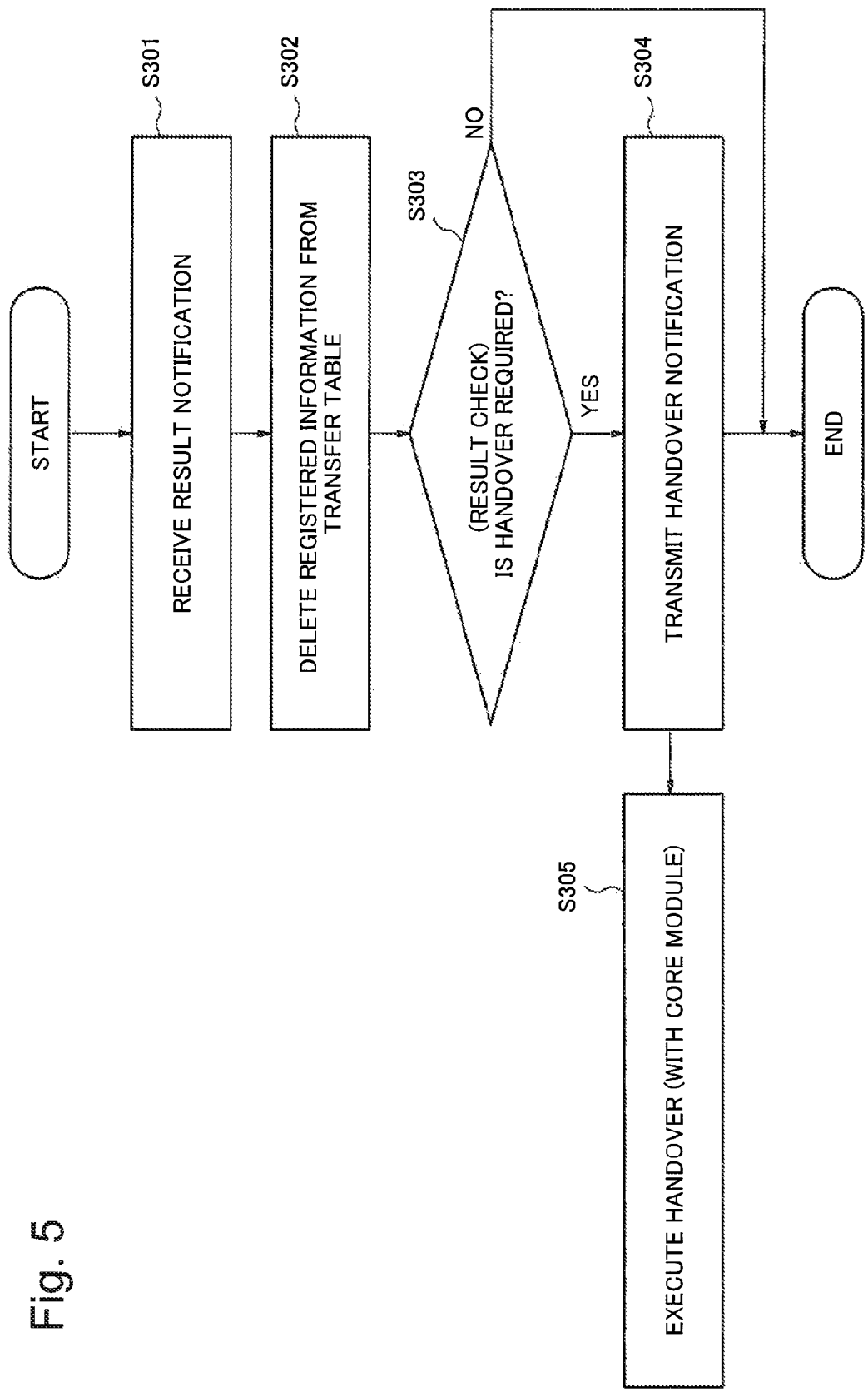
FIG. 5 is a flowchart illustrating processing performed by a result processing unit 203 in the exemplary embodiment of the present invention.

Next, the movement control processing performed by the EPC 30 after the result notification of the application type determination has been transmitted is described with reference to FIG. 5. FIG. 5 is a flowchart illustrating processing performed by the result processing unit 203 in the exemplary embodiment of the present invention.

First, the result processing unit 203 receives the result notification including the information indicating the determined application type and the identification information indicating the communication as the determination target from the application type determination unit 114 (step S301).

Then, the result processing unit 203 deletes the registered information related to the communication as the determination target from the transfer table 201, and then stops the data packet transfer thereafter (step S302).

Then, the result processing unit 203 checks the result notification to determine whether the handover is required (step S303). For example, the handover is determined to be required when the application type thus determined is Voice over IP, chatting, or the like involving low traffic and the large number of accesses.

For example, in the present exemplary embodiment, the result processing unit 203 determines that the handover is not required in any cases other than the one described above, and terminates the processing. By thus detecting the application type requiring no handover at an early stage, the user behavior analysis can be prevented from being performed more than necessary.

Upon determining that the handover is required, the result processing unit 203 transmits the handover notification including the identification information indicating the communication to the core module 31 of the EPC 30 (step S304).

After receiving the handover notification, the core module 31 identifies the mobile terminal 2 performing the communication based on the identification information indicating the communication in the handover notification. Then, the core module 31 changes the connection destination of the mobile terminal 2 from the microcell base station 20 to the macrocell base station 10 (handover) (step S305).

As described above, in the present exemplary embodiment, the mobile terminal 2 executing the application involving low traffic and a large number of accesses can be handed over from the microcell to the macrocell. Thus, the load balance between the concurrent accesses and the traffic amount can be controlled in the microcell base station 20 under an excessively accessed state.

As described above, the present exemplary embodiment provides an effect of preventing congestion in a wireless network due to the excessive number of accesses caused by concentrated connection of a large number of users of the application involving low traffic and a large number of accesses.

This is because the base station to which the mobile terminal is attached can be changed in accordance with the behavior of the communication performed by the application used by the user.

The handover of the mobile terminal may not be performed when the processing capacity of the microcell base station 20 is not used at its limit. Furthermore, the handover of the mobile terminal may not be performed when the processing capacity of the macrocell base station 10 is used at its limit.

Specifically, in step S102 or step S103 in FIG. 3, the monitor unit 200 may determine whether to transfer the replica of the data packet and the additional information to the user behavior analysis server 100, in accordance with the operation condition of the microcell base station 20 or the macrocell base station 10. Alternatively, in step S303 in FIG. 5, the result processing unit 203 may determine whether the mobile terminal 2 is to be handed over based on the operation condition of the microcell base station 20 or the macrocell base station 10. In this case, the monitor unit 200 constantly performs the monitoring and the behavior analysis processing. Alternatively, the application type determination unit 114 may change the condition in the type determination condition table stored in the application type determination unit 114 in accordance with the operation condition of the microcell base station 20 or the macrocell base station 10. Thus, the application type determination unit 114 increases or reduces the number of communications satisfying the type determination, and thus can increase or reduce the number of mobile terminals to be handed over. The processes described above may be performed in combination.

The information related to the operation condition of the microcell base station 20 or the macrocell base station 10 is obtained from the core module 31, an external apparatus (not illustrated) of the EPC 30, or the like.

Each mobile terminal 2 attached to the macrocell base station 10 may be the control target, instead of each mobile terminal 2 attached to the microcell base station 20 as the target in the present exemplary embodiment. In this case, in step S305 in FIG. 5, the core module 31 that has received the handover notification may operate in such a manner that the mobile terminal 2, identified based on the identification information indicating the communication in the handover notification, is prevented from being attached to the microcell base station 20. More specifically, the core module 31 may store the information in the handover notification, and may stop the handover to the microcell base station 20 when the mobile terminal 2 moves into the microcell service provision area 21 thereafter.

As described above, the mobile terminal 2, using the application behaving in such a manner that the attachment to the microcell base station 20 is unfavorable, continues to be connected to the macrocell base station 10. Thus, by performing the processing described above, the number of handovers can be reduced from that in present exemplary embodiment where the behavior analysis is performed after the handover to the microcell base station 20 is performed. The core module 31 continues to monitor the communication as the notification target, after storing the information in the handover notification. When the communication is terminated (when the user stops using the application), the core module 31 stops storing the information in the handover notification related to the communication.

The present exemplary embodiment is directed to the wireless network systems based on LTE and LTE-A. However, this should not be construed in a limiting sense. More specifically, the present exemplary embodiment can be applied to any wireless network system being a hierarchical cell structure and a function corresponding to a core network device that monitors communication data and controls handover between cells. The exemplary embodiment of the present invention may be partially or entirely described as the following Supplementary Notes but is not limited to the following.

(Supplementary Note 1)

A behavior analysis server device in a wireless network being a hierarchical cell structure in which a small scale microcell is disposed in a macrocell, the device includes:

a behavior analysis means for analyzing communication packets of each mobile terminal connected to the wireless network within a predetermined time and generating information indicating communication behavior as communication behavior information;

a recording means for recording the communication behavior information; and a type determination means for determining whether the communication behavior information satisfies a predetermined behavior type determination condition, and transmitting a notification for connecting a mobile terminal that has performed a communication associated with the communication behavior information satisfying the predetermined behavior type determination condition to a predetermined cell.

(Supplementary Note 2)

The behavior analysis server device according to Supplementary Note 1, wherein the communication behavior information includes information indicating a sum of communication data quantity and number of accesses in the analysis time, and the behavior type determination condition is based on a threshold related to the sum of communication data quantity and the number of accesses.

(Supplementary Note 3)

The behavior analysis server device according to Supplementary Note 1 or 2, wherein the behavior type determination condition includes a condition for identifying a particular application, and the type determination means transmits the notification for connecting a mobile terminal executing the identified particular application to the predetermined cell, in accordance with a type of the identified particular application.

(Supplementary Note 4)

The behavior analysis server device according to any one of Supplementary Notes 1 to 3, wherein the type determination means connects to a determination result processing means for selecting a cell to which the mobile terminal is connected, in accordance with an operation condition of a base station of the macrocell or the microcell based on the notification.

(Supplementary Note 5)

The behavior analysis server device according to Supplementary Note 4, wherein the determination result processing means performs a control in such a manner that, while a communication associated with the communication behavior information satisfying the behavior type determination condition is being performed, the mobile terminal performing the communication is not connected to the predetermined cell.

(Supplementary Note 6)

A control method for a mobile terminal for analyzing a behavior of each mobile terminal connected to a wireless network being a hierarchical cell structure in which a small scale microcell is disposed in a macrocell, the method comprising:

a behavior analysis step of analyzing communication packets of each mobile terminal connected to the wireless network within a predetermined time and generating information indicating communication behavior as communication behavior information;

a recording step of recording the communication behavior information in a recording means;

a type determination step of determining whether the communication behavior information satisfies a predetermined behavior type determination condition; and a determination result processing step of connecting a mobile terminal that has performed a communication associated with the communication behavior information determined to satisfy the predetermined behavior type determination condition in the determined in the type determination step to a predetermined cell.

(Supplementary Note 7)

The control method for the mobile terminal according to Supplementary Note 6, wherein the communication behavior information includes information indicating a sum of communication data quantity and number of accesses in the analysis time, and the behavior type determination condition is based on a threshold related to the sum of communication data quantity and the number of accesses.

(Supplementary Note 8)

The control method for the mobile terminal according to Supplementary Note 6 or 7, wherein the behavior type determination condition includes a condition for identifying a particular application, and in the determination result processing step, the mobile terminal executing the identified particular application is connected to the predetermined cell in accordance with a type of the identified particular application.

(Supplementary Note 9)

The control method for the mobile terminal according to any one of Supplementary Notes 6 to 8, wherein in the determination result processing step, a cell to which the mobile terminal is connected is selected in accordance with an operation condition of a base station of the macrocell or the microcell based on the notification.

(Supplementary Note 10)

The control method for the mobile terminal according to any one of Supplementary Notes 6 to 9, wherein in the determination result processing step, a control is performed in such a manner that, while a communication associated with the communication behavior information satisfying the behavior type determination condition is being performed, the mobile terminal performing the communication is not connected to the predetermined cell.

(Supplementary Note 11)

A mobile terminal control program for analyzing a behavior of each mobile terminal connected to a wireless network being a hierarchical cell structure in which a small scale microcell is disposed in a macrocell, the program causing a computer to execute:

behavior analysis processing of analyzing communication packets of each mobile terminal connected to the wireless network within a predetermined time and generating information indicating communication behavior as communication behavior information;

recording processing of recording the communication behavior information in a recording means; and type determination processing of determining whether the communication behavior information satisfies a predetermined behavior type determination condition, and transmitting a notification for connecting a mobile terminal that has performed a communication associated with the communication behavior information satisfying the predetermined behavior type determination condition to a predetermined cell.

(Supplementary Note 12)

The mobile terminal control program according to Supplementary Note 11, wherein the communication behavior information includes information indicating a sum of communication data quantity and number of accesses in the analysis time, and the behavior type determination condition is based on a threshold related to the sum of communication data quantity and the number of accesses.

(Supplementary Note 13)

The mobile terminal control program according to Supplementary Note 11 or 12, wherein the behavior type determination condition includes a condition for identifying a particular application, and in the type determination processing, the notification for connecting a mobile terminal executing the identified particular application to the predetermined cell is transmitted in accordance with a type of the identified particular application.

(Supplementary Note 14)

The mobile terminal control program according to any one of Supplementary Note 11 to 13, wherein in the type determination processing, a connection to a determination result processing which selects a cell to which the mobile terminal is connected, in accordance with an operation condition of a base station of the macrocell or the microcell based on the notification is made.

(Supplementary Note 15)

The mobile terminal control program according to Supplementary Note 14, wherein in the determination result processing, a control is performed in such a manner that, while a communication associated with the communication behavior information satisfying the behavior type determination condition is being performed, the mobile terminal performing the communication is not connected to the predetermined cell.

The invention of the present application, described with reference to the exemplary embodiment described above and the like, is not limited to the exemplary embodiment described above. The configuration and detail of the invention of the present application can be modified within the scope of the invention of the present application in various ways in manners understandable by a person skilled in the art.

The present invention is described above with the exemplary embodiment described above as a model example. However, the present invention is not limited to the exemplary embodiment described above. Thus, various modes of the present invention, understandable by a person skilled in the art, can be applied within the scope of the present invention.

This application claims a priority based on Japanese Patent Application No. 2012-210261 filed on Sep. 25 2012, the contents of which is herein incorporated in its entirety.

REFERENCE SIGNS LIST

1 User
2 Mobile terminal
10 Macrocell base station
11 Macrocell service provision area
20 Microcell base station
21 Microcell service provision area
30 EPC
31 Core module
100 User behavior analysis server
110 Packet analysis unit
111 User behavior recording unit
112 User behavior database
113 Data storage area
114 Application type determination unit
200 Monitor unit
201 Transfer table
202 Data storage area
203 Result processing unit
1000 Internet
1001 Backhaul

The invention claimed is:

1. A behavior analysis server device in a wireless network, wherein the wireless network includes a hierarchical cell structure in which a small-scale microcell is disposed in a macrocell, the device comprising:
an analysis unit, implemented by one or more processors, that:
analyzes data packets of each mobile terminal connected to the wireless network within a predetermined analysis time, and
generates communication behavior information;
a recording unit, implemented by the one or more processors, that:
records the communication behavior information;
a type determination unit, implemented by the one or more processors, that:
determines whether the communication behavior information satisfies a predetermined behavior type determination condition; and
a transceiver that transmits a notification for connecting a mobile terminal to a predetermined cell, the mobile terminal having performed communication behavior satisfying the predetermined behavior type determination condition,
wherein the communication behavior information indicates a sum of communication data quantity and a number of accesses in the analysis time, and
wherein the behavior type determination condition is based on a threshold related to the sum of communication data quantity and the number of accesses.

2. The behavior analysis server device according to claim 1,
wherein the behavior type determination condition includes a condition for identifying a particular application, and
wherein the transceiver transmits the notification for connecting a mobile terminal executing the identified particular application to the predetermined cell in accordance with a type of the identified particular application.

3. A control device in a wireless network, wherein the wireless network includes a hierarchical cell structure in which a small-scale microcell is disposed in a macrocell, the device comprising:
an analysis unit, implemented by one or more processors, that:
analyzes data packets of each mobile terminal connected to the wireless network within a predetermined analysis time, and
generates communication behavior information;
a recording unit, implemented by the one or more processors, that:
records the communication behavior information;
a type determination unit, implemented by the one or more processors, that:
determines whether the communication behavior information satisfies a predetermined behavior type determination condition;
a result processing unit, implemented by the one or more processors, that:
selects a cell in accordance with provessing capacity of a base station of the macrocell or the microcell and the notification, the cell being for the mobile terminal to connected to; and
a transceiver that:
transmits a notification for connecting a mobile terminal to a predetermined cell, the mobile terminal having performed communication behavior satisfying the predetermined behavior type determination condition; and
receives the notification including information indicating an application type associated with an application which is executed on the mobile terminal and an identification information about a communication that the application is performing,
wherein the communication behavior information indicates a sum of communication data quantity and a number of accesses in the analysis time, and
wherein the behavior type determination condition is based on a threshold related to the sum of communication data quantity and the number of accesses.

4. The control device according to claim 3,
wherein the result processing unit further performs a control in such a manner that, while the communication is being performed, the mobile terminal is not connected to the predetermined cell.

5. A control method for a mobile terminal for analyzing a behavior of each mobile terminal connected to a wireless network, wherein the wireless network includes a hierarchical cell structure in which a small-scale microcell is disposed in a macrocell, the method comprising:

analyzing data packets of each mobile terminal connected to the wireless network within a predetermined analysis time;

generating information indicating communication behavior as communication behavior information;

recording the communication behavior information in a recording unit;

determining whether the communication behavior information satisfies a predetermined behavior type determination condition; and connecting a mobile terminal to a predetermined cell, the mobile terminal having performed communication behavior satisfying the predetermined behavior type determination condition, wherein the communication behavior information includes information indicating a sum of communication data quantity and a number of accesses in the analysis time, and wherein the behavior type determination condition is based on a threshold related to the sum of communication data quantity and the number of accesses.

6. The control method for the mobile terminal according to claim 5, wherein the behavior type determination condition includes a condition for identifying a particular application, and wherein the mobile terminal executing the identified particular application is connected to the predetermined cell in accordance with a type of the identified particular application.

7. The control method for the mobile terminal according to claim 5, wherein the cell to which the mobile terminal is connected is selected in accordance with a processing capacity of a base station of the macrocell or the microcell and the notification.

8. The control method for the mobile terminal according to claim 5, wherein while a communication associated with the communication behavior information satisfying the behavior type determination condition is being performed, the mobile terminal performing the communication is not connected to the predetermined cell.

9. A non-transitory computer-readable medium storing a computer program which, when executed, cause one or more processors to perform operations for analyzing communication behavior, the operations comprising:

analyzing data packets of each mobile terminal connected to the wireless network within a predetermined analysis time;

generating communication behavior information;

recording the communication behavior information in a recording unit;

determining whether the communication behavior information satisfies a predetermined behavior type determination condition; and transmitting a notification for connecting a mobile terminal to a predetermined cell, the mobile terminal having performed communication behavior satisfying the predetermined type determination condition, wherein the communication behavior information includes information indicating a sum of communication data quantity and a number of accesses in the analysis time, and wherein the behavior type determination condition is based on a threshold related to the sum of communication data quantity and the number of accesses.

10. The non-transitory computer-readable medium according to claim 9, wherein the behavior type determination condition includes a condition for identifying a particular application, and wherein the notification for connecting a mobile terminal executing the identified particular application to the predetermined cell is transmitted in accordance with a type of the identified particular application.

11. A non-transitory computer-readable medium storing a computer program which, when executed, cause one or more processors to perform operations for analyzing communication behavior, the operations comprising:

analyzing data packets of each mobile terminal connected to the wireless network within a predetermined analysis time;

generating communication behavior information;

recording the communication behavior information in a recording unit;

determining whether the communication behavior information satisfies a predetermined behavior type determination condition;

transmitting a notification for connecting a mobile terminal to a predetermined cell, the mobile terminal having performed communication behavior satisfying the predetermined type determination condition;

receiving the notification including information indicating an application type associated with an application which is executed on the mobile terminal and an identification information about a communication that the application is performing; and selecting a cell in accordance with processing capacity of a base station of a macrocell or a microcell and the notification, the cell being for the mobile terminal to connected to, wherein the communication behavior information indicates a sum of communication data quantity and a number of accesses in the analysis time, and wherein the behavior type determination condition is based on a threshold related to the sum of communication data quantity and the number of accesses.

12. The non-transitory computer-readable medium according to claim 11, wherein while the communication is being performed, the mobile terminal is not connected to the predetermined cell.

* * * * *